(No Model.) 3 Sheets—Sheet 2.
R. H. ELLIOTT.
REAMER.
No. 564,510. Patented July 21, 1896.
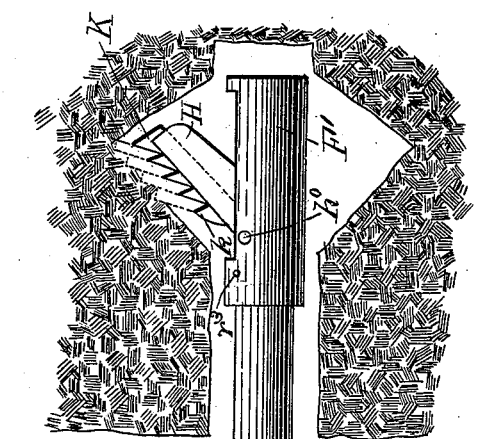
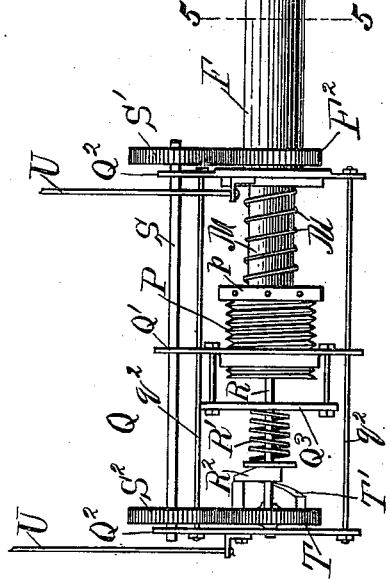
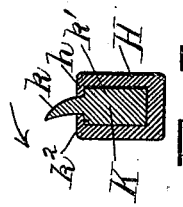
Fig. 5.
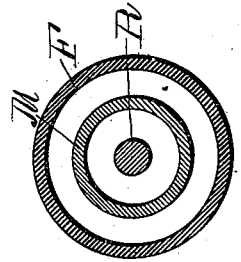
Fig. 6.
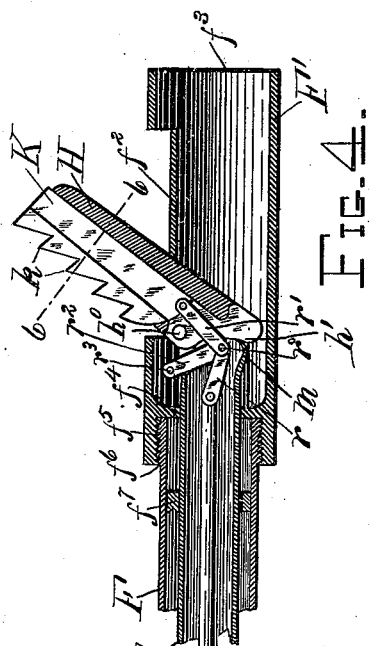
Fig. 4.
Witnesses
John H. Holt,
John C. Wilson
Inventor
R. H. Elliott,
by Whitman & Wilkinson
Attorneys (No Model.) 3 Sheets—Sheet 3.
R. H. ELLIOTT.
REAMER.
No. 564,510. Patented July 21, 1896.
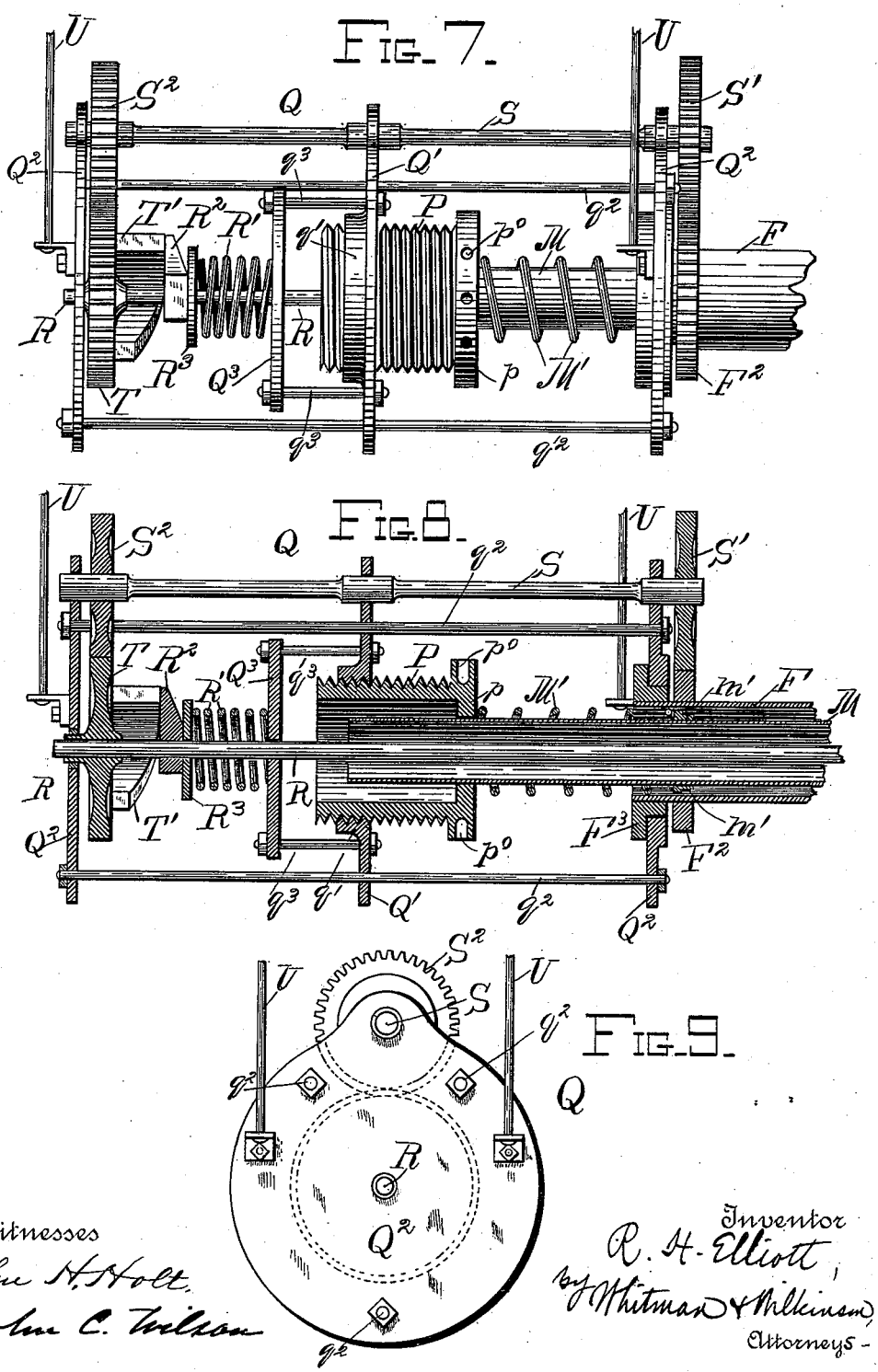

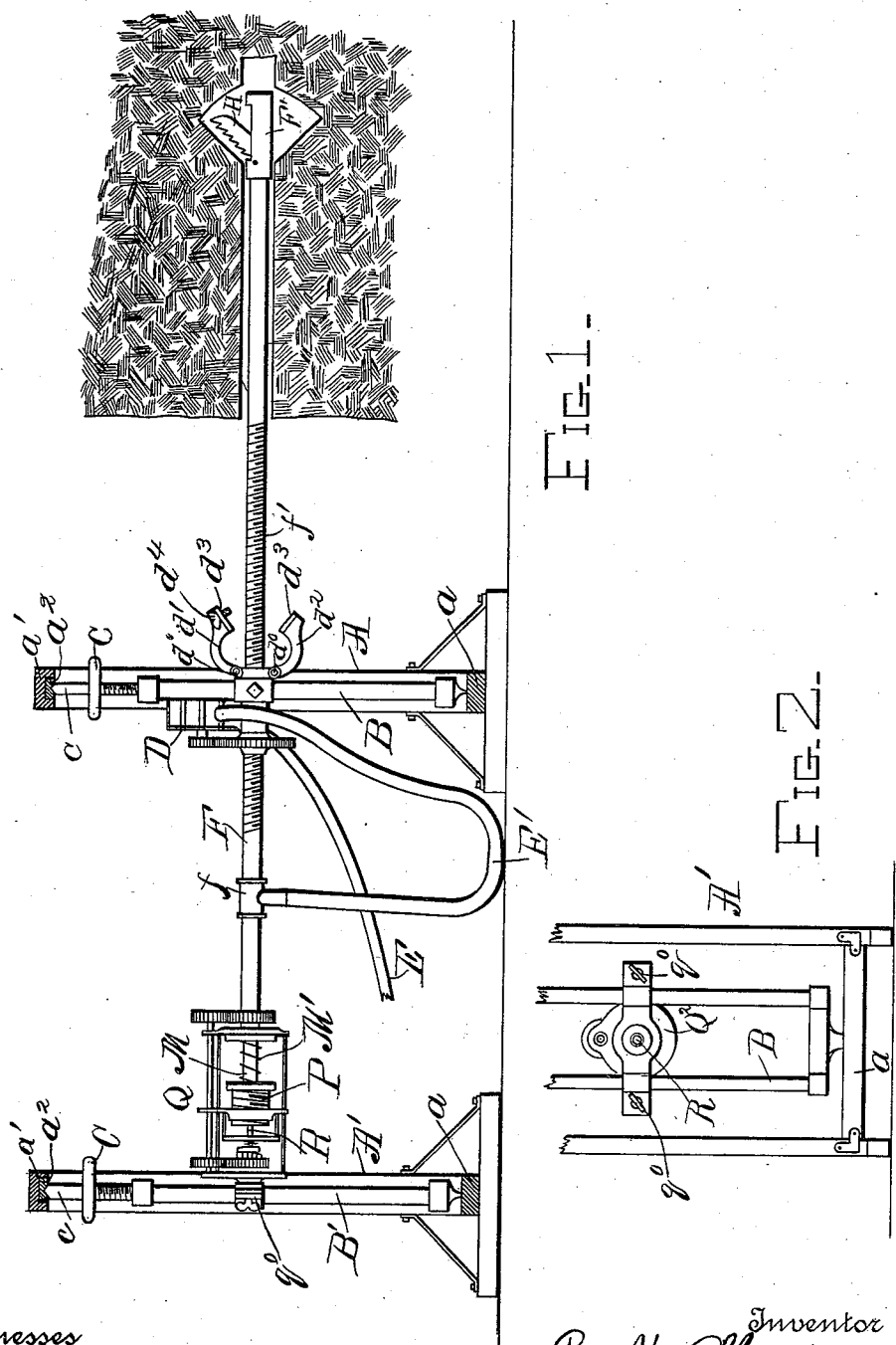

UNITED STATES PATENT OFFICE.

ROBERT H. ELLIOTT, OF BIRMINGHAM, ALABAMA, ASSIGNOR TO THE ALABAMA BLASTING AND MINING COMPANY, OF SAME PLACE.

REAMER.

SPECIFICATION forming part of Letters Patent No. 564,510, dated July 21, 1896.

Application filed October 18, 1895. Serial No. 566,100. (No model.)

*To all whom it may concern:*

Be it known that I, ROBERT H. ELLIOTT, a citizen of the United States, residing at Birmingham, in the county of Jefferson and State of Alabama, have invented certain new and useful Improvements in Reamers; and I do hereby declare the following to be a full, clear, and exact description of the invention, such as will enable others skilled in the art to which it appertains to make and use the same.

My invention relates to improvements in mining-machines, and especially to certain improvements in reamers, whereby the feed of the reamer-blade may be regulated as may be desired and whereby the said reamer-blade is provided with a plurality of reciprocating cutting-teeth, which teeth are moved outward and inward relative to the axis of the reamer-spindle as the latter is revolved.

My invention also relates to certain novel construction, combination, and arrangement of parts that will be hereinafter more fully described and claimed.

Reference is had to the accompanying drawings, in which the same parts are indicated by the same letters throughout the several views.

Figure 1 represents a side elevation of the entire apparatus and shows the reamer in operation in the bore-hole. Fig. 2 represents a rear view as seen from the left of Fig. 1 and on a somewhat enlarged scale. Fig. 3 represents a side elevation of the feed and reciprocating mechanism for the reamer, the reamer-spindle being broken away and the parts for rotating the said spindle being omitted for the sake of clearness in the drawings. Fig. 4 represents a central longitudinal section of the reamer-head, the reciprocating block carrying the cutting-teeth being shown in elevation. Fig. 5 represents a section along the line 5 5 of Fig. 3. Fig. 6 represents a section along the line 6 6 of Fig. 4. Fig. 7 represents a side elevation, on an enlarged scale, of the feeding and reciprocating attachment. Fig. 8 represents a central vertical section through the device shown in Fig. 7, and Fig. 9 represents an end view of the device shown in Figs. 7 and 8 as seen from the left of the said figure.

A represents the frame on which the driving-engine D and its supporting-frame B are supported. This frame is provided with a cross-piece $a$ at the lower side thereof to support the frame B and an upper cross-piece $a'$, provided with a bearing-block $a^2$, adapted to engage the upper end of the screw $c$, which is adjusted by means of the hand-wheel C. The reamer-spindle F is connected to and driven by the engine D in the usual way. The frame Q at the rear end of the spindle, in which the feed and reciprocating mechanism are mounted, is connected as by clamp-screws $q^0$ to a similar frame B', similar in every respect to the frame B, and mounted in the supporting-frame A', generally similar to the frame A already described. These frames A and A' may be omitted, if desired, and the frames B and B' may be secured directly in the drift or tunnel in the ordinary way, if preferred.

The engine D is preferably driven by compressed air from the pipe E, (see Fig. 1,) while the exhaust-air from the said engine is carried by means of the hose E' through the connections $f$ and into the hollow reamer-spindle F, through which it is blown and from which it escapes through the reamer-head F', blowing back the chips or cuttings to the rear through the bore-hole, as is well known in the art. This reamer-spindle F is screw-threaded, as at $f'$, and may be fed into or out of the bore-hole by means of the two half-nuts $d^3$, held together by means of the clamp-screws $d^4$, which half-nuts are formed at the ends of the arms $d'$ and $d^2$, pivoted at $d^0$ to the engine-frame. During the process of reaming these arms are swung open, as shown at Fig. 1, and the requisite feed is given to the reamer-blade by means of the feeding device at the rear end of the reamer-spindle, which will be hereinafter described.

The slotted bar H is pivoted, as at $h^0$, in the reamer-head F', and swings in and out through the opening $f^2$ in the side of the reamer-head, while the end $f^3$ of the reamer-head is preferably left open, as shown in Fig. 4, whereby the air blown through the reamer-spindle may pass not only through the opening $f^2$, but also through the opening $f^3$ of the reamer-head, if desired. However, the end of the reamer-head may be closed, if desired, and all the air passing through the reamer-spindle may be blown through the opening $f^2$, and will thus strike more directly the particles chipped out by the reamer-blade. This reamer-head is preferably secured to the hollow reamer-spindle by means of the screw-threads $f^5$ and $f^6$, as shown in Fig. 4, and is provided with ribs $f^4$, adapted to bear against the end of the reamer-spindle F and to inclose the hollow spindle M, through which passes the rod R, hereinafter to be described. The reamer-spindle F is also spaced from the hollow spindle M by blocks or lugs $f^7$, and these lugs $f^7$ and ribs $f^4$ are so disposed as to allow the free passage of air from the hose E' through the hollow reamer-spindle F and through the reamer-head F'.

The bar H is slotted longitudinally, as shown in Figs. 4 and 6, and is provided with overhanging lips $h$ to engage the reciprocating blade K. The said bar H is pivoted, as at $h^0$, and is provided with a heel $h'$, adapted to engage the rounded ends $m$ of the hollow spindle M, whereby the said bar H may be swung out or allowed to swing into the reamer-head again, as may be desired.

The reciprocating blade K consists of a solid block $k'$, shouldered, as at $k^2$, beneath the lips $h$ and provided with projecting teeth $k$, which are preferably bent over somewhat like a cat's claw, as shown in Fig. 6, the normal direction of the bar H and of the said claw-like teeth $k$ being represented by the arrow in Fig. 6. This reciprocating block K is connected by means of the links $r'$ and $r$, pivoted together at $r^0$ to the rod R, by means of which a reciprocating motion is given, as will be hereinafter more fully described. The pivot $r^0$ between these two links is also connected to the link $r^2$, pivoted at $r^3$ in the reamer-head F', whereby the said links $r$ and $r'$ are prevented from dropping down in the opposite direction from that shown in Fig. 4 when the reamer-head is revolved through one hundred and eighty degrees from the position shown in the said Fig. 4.

The hollow spindle M is provided near its rear end with a set-collar $m'$, against which bears the forward end of the coil-spring M', the rear end of which spring bears against the face $p$ of the screw-threaded sleeve P, which sleeve engages in the nut $q'$ of the plate Q', and is provided with a broad flange, perforated, as at $p^0$, to engage capstan-bars, whereby the said screw-threaded sleeve may be screwed out or in relative to the nut $q'$, and thus the tension on the spring M' may be regulated at will. The tension of this spring forces the spindle M forward, and thus causes the bar H to swing outward as the reamed-out chamber is enlarged by the operation of the reciprocating cutting-blade.

The frame Q is provided not only with the plate Q', already referred to, but with the two end plates Q², connected together by the tie-bolts $q^2$ and the shaft S, and with the smaller plate Q³, connected by the tie-bolt $q^3$ to the plate Q', and perforated to allow the free passage therethrough of the rod R.

The inner end of the reamer-spindle F is provided with a flange set-collar F³, journaled in the plate Q², and the said reamer-spindle also carries the gear-wheel F², meshing in the gear-wheel S' on the shaft S, which shaft also carries the gear-wheel S², meshing in the gear-wheel T, to which the cam T' is attached. The rod R forms a journal-bearing for this gear-wheel T, and the said gear-wheel is also journaled in the plate Q², as shown in Fig. 8, and thus the said gear-wheel is free to revolve on the said rod R. This rod R has rigidly attached thereto the toe R², which bears on the face of the cam T', and against the back of said toe bears the plate R³, between which and the plate Q³ the spring R' is placed under compression, the tendency of the said spring being to force the plate R³, the toe R², and the rod R backward after the same have been forced forward by the action of the cam T', whereby a reciprocating motion is given to the said rod and from it to the cutting-blade K, while the reamer-spindle continues to revolve about its axis. At the same time the spring M' forces the spindle M and the arm H outward, and thus a gradual outward motion of the arm H and a rapid reciprocating motion of the blade K is obtained while the reamer-spindle is rotating about its axis. By regulating the relative sizes of the gear-wheels F² and S' and S² and T any desired speed of reciprocation of the cutting-blade relative to the speed of rotation of the reamer-spindle may be obtained.

Instead of a frame A', supported from the ground, as shown in Fig. 1, the frame Q may be suspended from overhead, as by means of rods U, (shown in Figs. 7 to 9,) or the said frame Q, and likewise the engine and parts connected thereto, may be supported in any convenient way, the said supports not being a part of my present invention and being capable of being constructed by any skilled mechanic.

It will also be evident that a great many modifications of the herein-described apparatus might be made which could be used without departing from the spirit of my invention. I therefore do not intend to limit myself to the precise details of construction or the precise combinations and arrangements of parts herein described; but What I do claim, and desire to secure by Letters Patent of the United States, is—

1. In a reamer, the combination with a slotted bar, pivoted in the reamer-head, and provided with overhanging lips, of a block traveling in said slot and provided with shoulders to engage beneath said lips, and with teeth projecting between said lips, and means for simultaneously rotating said reamer-head, and reciproctaing said block, in said slot, substantially as described.

2. In a reamer, the combination with a bar pivoted in the reamer-head, and provided with a longitudinal slot therein, with overhanging lips, of a block sliding in said slot and having shoulders engaging beneath said lips, and a plurality of teeth bent over laterally and projecting between said lips, and means for simultaneously forcing said bar outward, for rotating said reamer-head, and for reciprocating said block in said slot, substantially as described.

3. In a reamer, the combination with a bar pivoted in the reamer-head, and provided with a guideway therein, of a cutting-blade traveling in said guideway, a hollow spindle adapted to force said bar outward a rod inclosed in said hollow spindle with links connecting said rod with said cutting-blade, a link also pivoted in the hollow reamer-head and connected to the links aforesaid, a spring normally tending to withdraw said rod, and a cam rotating at a different speed from that of the reamer-head, and adapted to impart a reciprocating motion to said rod, substantially as described.

4. In a reamer, the combination with a bar pivoted in the reamer-head and provided with a guideway therein, of a cutting-blade traveling in said guideway, a hollow spindle adapted to force said bar outward, a spring normally pressing said hollow spindle, toward said bar, and means for adjusting the tension on said spring, a rod inclosed in said hollow spindle with links connecting said rod with said cutting-blade, a link also pivoted in the hollow reamer-head and connected to the links aforesaid and means for simultaneously rotating said reamer-head, and reciprocating said rod, substantially as described.

5. In a reamer, the combination with a bar pivoted in the reamer-head and provided with a guideway therein, of a cutting-blade traveling in said guideway, a hollow spindle bearing against the heel of said bar and adapted to force the outer end of said bar outward, a spring normally pressing said hollow spindle toward said bar, a nut and screw for adjusting the tension on said spring, a rod inclosed in said hollow spindle, with links connecting said rod with said cutting-blade, a link also pivoted in the hollow reamer-head and connected to the links aforesaid and means for simultaneously rotating said reamer-head, and reciprocating said rod, substantially as described.

6. In a reamer, the combination with an extensible cutting-blade pivotally mounted in the reamer-head, a hollow spindle passing through the reamer-spindle and bearing against the heel of said bar, a spring normally pressing said hollow spindle forward, and a feed-screw and nut adapted to regulate the tension of said spring, substantially as and for the purposes described.

7. In a reamer, the combination with an extensible cutting-wing pivoted in the reamer-head, of a hollow spindle inclosed in the reamer-spindle, and adapted to force said wing outward, a spring normally pressing said inner hollow spindle outward, and a feed-screw and nut, for adjusting the tension on said spring, substantially as and for the purposes described.

8. In a reamer, the combination with a bar pivoted in the reamer-head, and provided with a guideway therein, of a cutting-blade traveling in said guideway, means for forcing said bar outward, a rod inclosed in the reamer-spindle and passing to the rear, with a toe fast to said rod, a spring normally pressing said toe to the rear, and a cam rotating at a different rate of speed from the drill-spindle bearing on said toe, and adapted to impart a reciprocating motion to said rod, substantially as described.

In testimony whereof I affix my signature in presence of two witnesses.

ROBERT H. ELLIOTT.

Witnesses:
J. B. ROBINSON,
WILL. T. DILLON.